United States Patent
Oishi

[11] 3,938,882
[45] Feb. 17, 1976

[54] HIGH NUMERICAL APERTURE INTERMEDIATE WIDE ANGLE OBJECTIVE

[75] Inventor: Michiro Oishi, Tokyo, Japan

[73] Assignee: Asahi Kogyo Kabushiki Kaisha, Tokyo, Japan

[22] Filed: Sept. 20, 1974

[21] Appl. No.: 507,743

[30] Foreign Application Priority Data
Sept. 27, 1973 Japan............................ 48-108715

[52] U.S. Cl................................. 350/214; 350/176
[51] Int. Cl.².......................................... G02B 9/64
[58] Field of Search........................... 350/214, 176

[56] References Cited
UNITED STATES PATENTS

| | | | |
|---|---|---|---|
| 3,036,499 | 5/1962 | Lautenbacher | 350/214 |
| 3,507,559 | 4/1970 | Mori | 350/214 |

FOREIGN PATENTS OR APPLICATIONS

| | | | |
|---|---|---|---|
| 28,832 | 9/1970 | Japan | 350/214 |

*Primary Examiner*—John K. Corbin
*Attorney, Agent, or Firm*—Christie, Parker & Hale

[57] ABSTRACT

A 7 group 8 lens photographic objective lens which corrects for aberration.

3 Claims, 6 Drawing Figures

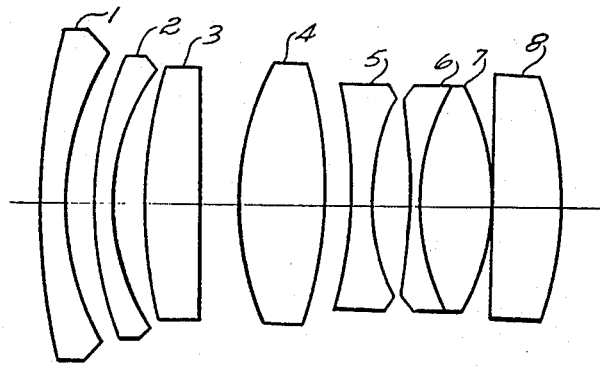
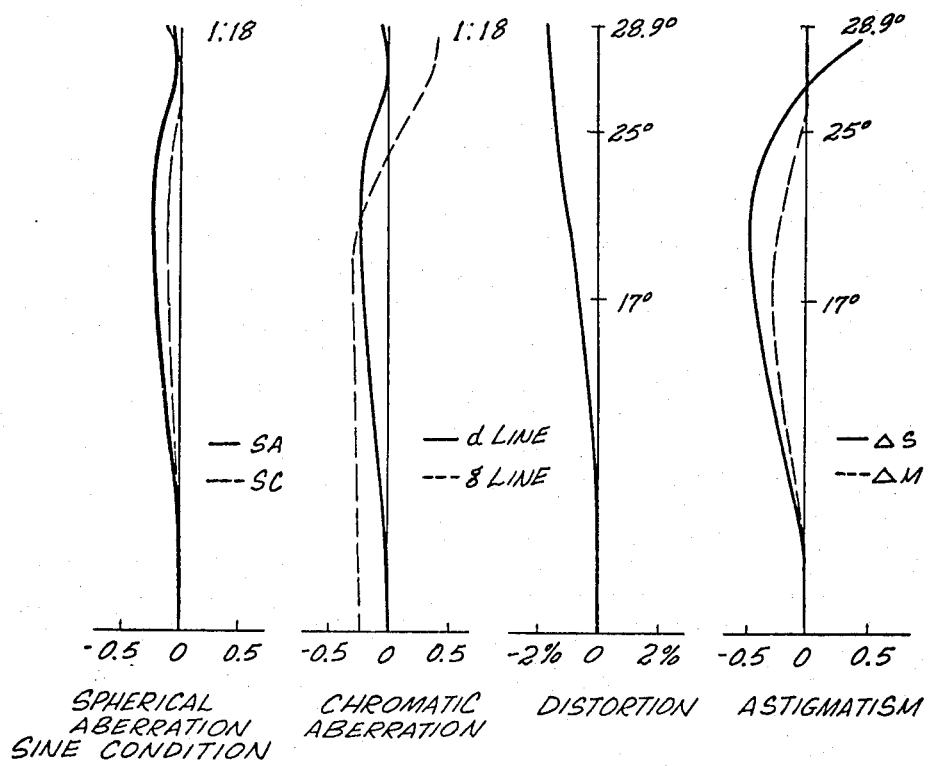

HIGH NUMERICAL APERTURE INTERMEDIATE WIDE ANGLE OBJECTIVE

BACKGROUND OF THE INVENTION

The present invention relates to a high numerical aperture intermediate wide angle lens system of image angle ranging from 55° to 60°, which is small in size and suitable for use in a single lens reflex camera as a retro focus type objective.

SUMMARY OF THE INVENTION

The present invention involves high numerical aperture intermediate wide angle objective lens system whose aberration is corrected to a high degree of excellence and which is a retro focus lens system consisting of a 7 group 8 lens system characterized in that the image angle is 55° or greater and which satisfies the following conditions:

$$F / 1.4 < |F_{1,2}| < F / 0.8, F_{1,2} < 0 \quad \quad 1$$
$$F / 1.4 < |F_{1,2,3,4}| < F / 0.9 \quad \quad 2$$

$$0.8 < \frac{(d_1 + d_2 + d_3 + \cdots + d_6 + d_7)}{(d_8 + d_9 + d_{10} + \cdots + d_{13} + d_{14})} < 1.3 \quad \quad (3)$$

$$1.1 < (\nu_1 + \nu_2) / (\nu_3 + \nu_4) < 1.6 \quad \quad 4$$

where;

- $F$: is the resultant focal length of the whole optical system;
- $F_{1,2\ldots i}$: is the resultant focal length of the first to the i-th lenses;
- $n_i$: is the d-line index of refraction of the i-th lens;
- $\nu_i$: is the Abbe's number of the i-th lens;
- $r_k$: is the radius of curvature of the k-th surface;
- $d_j$: is the j-th lens spacing or lens thickness.

BRIEF DESCRIPTION OF THE DRAWINGS

FIG. 3 shows the lens system of example 2;
FIG. 4 shows graphs of the aberration curves of example 2.

DESCRIPTION OF THE PREFERRED EMBODIMENT

Figure 1:
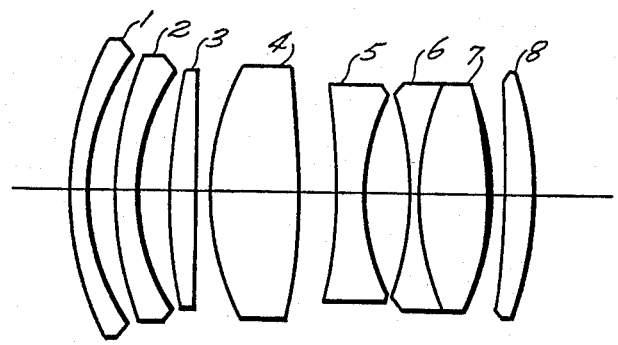
FIG. 1 shows the lens system of example 1.
Figure 2:
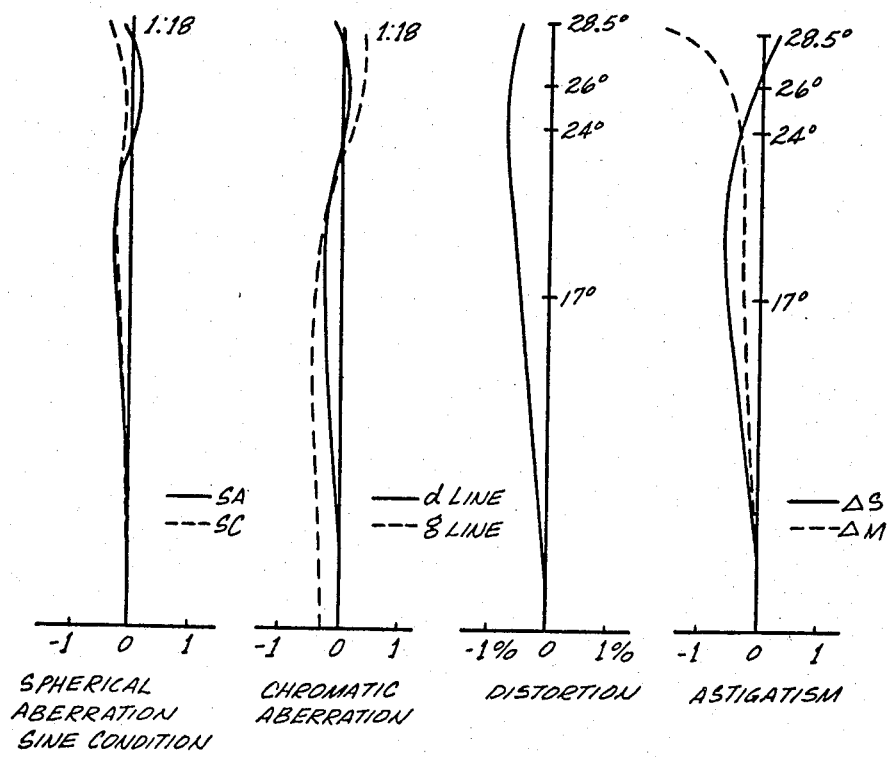
FIG. 2 shows graphs of the aberration curves of example 1.
Figure 5:
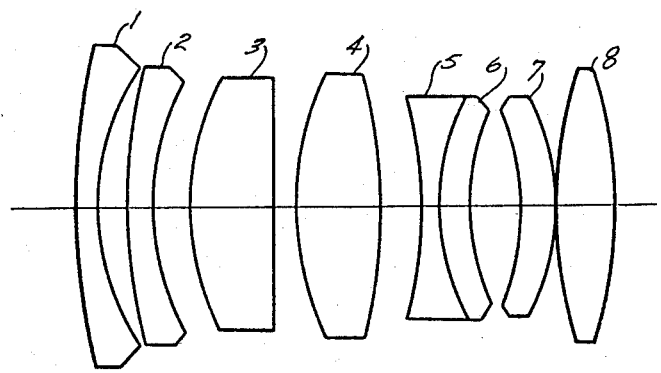
FIG. 5 shows the lens system of example 3.
Figure 6:
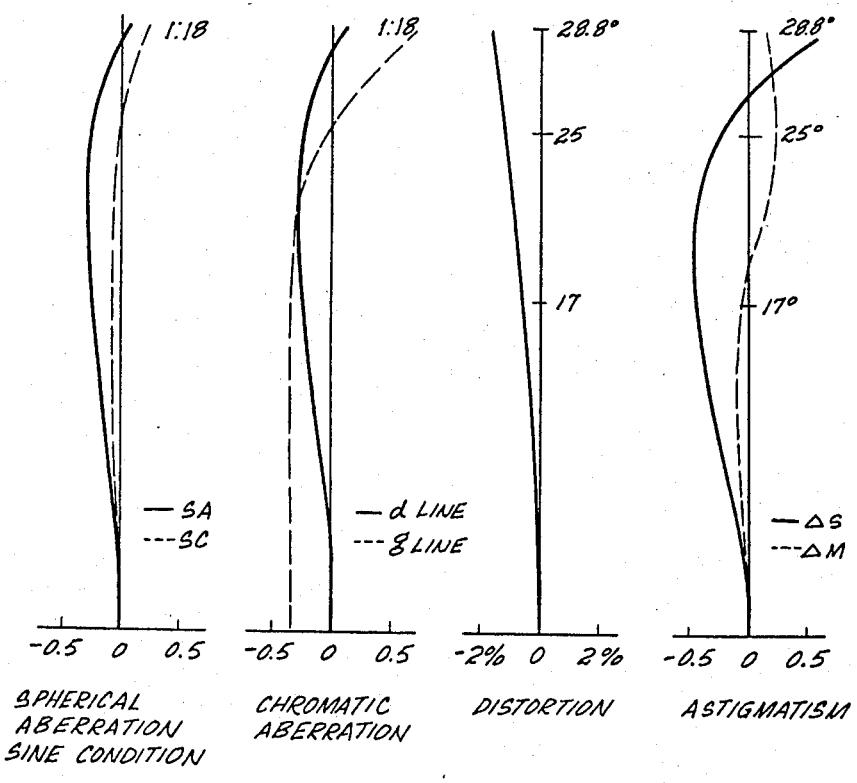
FIG. 6 shows graphs of the aberration curves of example 3.

The first and the second lenses 1 and 2 are of negative meniscus type whose concave surfaces are directed to the image side; the third and the fourth lenses 3 and 4 are of positive type and are positioned opposite to the fifth lens with a diaphragm (not shown) positioned therebetween. The fifth lens 5 is of negative type. In example 3 (FIG. 5), the fifth lens 5 and the sixth lens 6 are cemented together. In examples 1 and 2, the sixth lens 6 is of negative type and is cemented to the seventh lens 7. In all examples, the seventh and eighth lenses 7 and 8 are of positive type. Each example is of 7 group 8 lens structure.

In the conditions indicated below, the characters denote as follows:

- $F$: is the resultant focal length of the whole optical system;
- $F_{1,2\ldots i}$: is the resultant focal length of the first to the i-th lenses;
- $n_i$: is the d-line index of refraction of the i-th lens;
- $\nu_i$: is the Abbe's number of the i-th lens;
- $r_k$: is the radius of curvature of the k-th surface;
- $d_j$: is the j-th lens spacing or lens thickness.

In accordance with the present invention, the optical system is characterized with the following conditions:

$$F / 1.4 < |F_{1,2}| < F / 0.8, F_{1,2} < 0 \quad \quad 1$$
$$F / 1.4 < |F_{1,2,3,4}| < F / 0.9 \quad \quad 2$$

$$0.8 < \frac{(d_1 + d_2 + d_3 + d_4 + d_5 + d_6 + d_7)}{(d_8 + d_9 + d_{10} + d_{11} + d_{12} + d_{13} + d_{14})} < 1.3 \quad \quad (3)$$

$$1.1 < (\nu_1 + \nu_2) / (\nu_3 + \nu_4) < 1.6 \quad \quad 4$$

Condition 1 indicates the power of the front group negative lenses of the retro focus lens system. Naturally, for small size, it is necessary to increase the power of the negative lenses and diminish the spacing. However, if the negative value of the focal length $F_{1,2}$ is too much smaller than $F / 1.4$, the desired result is obtained but aberration is aggravated and it is difficult to compensate for aberration at the rear lens group. If focal length $F_{1,2}$ is greater than $F / 0.8$, miniaturization of the lens system is not likely to be attained. Under this condition, steps must be taken to obtain greater back focus at the rear lens group, and also corresponding steps must be taken for correction of aberration.

Conditions 2, with relation to the condition 4, indicate steps for compensation of chromatic aberration, and is, naturally, for correcting aberrations caused under the condition 1. If the focal length $F_{1,2,3,4}$ is smaller than $F / 1.4$, the desired chromatic aberration can be advantageously corrected, but this is apt to cause decrease of Petzval sum or decrease of the radius of curvature of each surface, and especially variation of coma aberration. Furthermore, this will disadvantageously prevent increase in the value of back focus determined by the focal length $F_{1,2}$. On the other hand, a focal length value which is greater than $F / 0.9$ is advantageous for Petzval sum, but this will naturally cause a limitation such that for correction of chromatic aberration, a very small value of Abbe's number $\nu$ must be utilized. Thus, condition 2 is most advantageous.

Condition 3 is necessary for miniaturization and also for keeping balance between the front lens group and the rear lens group. If the value of the condition 3 ratio is smaller than the left side value, miniaturization is advantageously attained, but a far greater power combination is required at the front lens group and this will naturally cause failure of condition 1 and disadvantage in correction. In order to retain vignetting light, in relation to coma aberration, certain steps are taken such as increasing the diameter of the rear lens group, but this causes a failure in balance between the front lens group and the rear lens group. Further, difficulty is caused in correction of aberration. This requires such undesirables as increasing the number of lenses used or impossibility in retaining numerical aperture. On the other hand, if condition 3 is greater than 1.3, for the admission of the proper amount of light into the diaphragm aperture, the front lens group must be made greater in size. This is contra to the object of miniaturization and is therefore undesirable.

Condition 4 is closely related with condition 2 and determines the value of Abbe's number $\nu$ which is necessary for correction of chromatic aberration. If ($\nu_1$ +

$\nu_2) / (\nu_3 + \nu_4)$ is smaller than 1.1, correction of chromatic aberration up to the fourth lens is not sufficient and particularly too much of the transverse chromatic aberration may be produced. This requires that special steps should be taken at the rear lens group which is undesirable for correction of aberrations. On the other hand, if the last mentioned value of ratio is greater than 1.6, it is feared that correction of chromatic aberration up to the fourth lens would be too little, and this is undesirable for overall balance of chromatic aberration.

The data for the examples and the Seidel's coefficients of the examples are as follows:

Example 1

| Radius of Curvature in m m | | Lens Spacing in m m | $n_i / \nu_i$ |
|---|---|---|---|
| $r_1$ | 92.500 | $d_1$ 3.95 | 1.51633 / 64.1 |
| $r_2$ | 57.275 | $d_2$ 9.52 | |
| $r_3$ | 132.250 | $d_3$ 5.32 | 1.69350 / 53.3 |
| $r_4$ | 55.875 | $d_4$ 9.42 | |
| $r_5$ | 167.500 | $d_5$ 7.50 | 1.83400 / 37.2 |
| $r_6$ | 1537.500 | $d_6$ 2.50 | |
| $r_7$ | 68.313 | $d_7$ 26.50 | 1.78590 / 44.2 |
| $r_8$ | −178.523 | $d_8$ 9.27 | |
| $r_9$ | −149.500 | $d_9$ 9.00 | 1.76182 / 26.6 |
| $r_{10}$ | 68.250 | $d_{10}$ 9.67 | |
| $r_{11}$ | −159.375 | $d_{11}$ 5.00 | 1.74077 / 27.8 |
| $r_{12}$ | 80.750 | $d_{12}$ 19.20 | 1.80610 / 40.8 |
| $r_{13}$ | −79.500 | $d_{13}$ 3.75 | |
| $r_{14}$ | −951.448 | $d_{14}$ 8.75 | 1.78590 / 44.2 |
| $r_{15}$ | −111.275 | | |

F = 100.0
$F_{1,2}$ = 95.13
$F_{1,2,3,4}$ = 83.54

Seidel's Coefficients

| Lens Surface | $S_1$ | $S_2$ | $S_3$ | $S_4$ | $S_5$ |
|---|---|---|---|---|---|
| | 0.284 | 0.131 | 0.061 | 0.368 | 0.198 |
| 2 | −2.375 | −0.138 | −0.008 | −0.595 | −0.035 |
| 3 | 0.493 | 0.272 | 0.151 | 0.310 | 0.255 |
| 4 | −9.272 | −0.324 | −0.011 | −0.733 | −0.026 |
| 5 | 2.942 | 0.879 | 0.263 | 0.271 | 0.160 |
| 6 | −0.187 | −0.225 | −0.270 | −0.030 | −0.360 |
| 7 | 4.454 | 0.977 | 0.214 | 0.637 | 0.187 |
| 8 | 3.146 | −1.869 | 1.111 | 0.247 | −0.806 |
| 9 | −2.925 | 1.608 | −0.884 | −0.289 | 0.645 |
| 10 | −1.069 | −0.892 | −0.743 | −0.634 | −1.148 |
| 11 | 0.003 | −0.010 | 0.034 | −0.267 | 0.771 |
| 12 | 0.264 | 0.175 | 0.116 | 0.026 | 0.094 |
| 13 | 1.593 | −0.366 | 0.084 | 0.561 | −0.148 |
| 14 | −0.074 | 0.120 | −0.193 | −0.046 | 0.386 |
| 15 | 3.029 | −0.261 | 0.023 | 0.395 | −0.036 |
| SUM | 0.306 | 0.078 | −0.054 | 0.223 | 0.134 |

Example 2

| Radius of Curvature in m m | | Lens Spacing in m m | $n_i / \nu_i$ |
|---|---|---|---|
| $r_1$ | 175.400 | $d_1$ 6.90 | 1.53172 / 48.9 |
| $r_2$ | 73.563 | $d_2$ 9.42 | |
| $r_3$ | 128.468 | $d_3$ 3.00 | 1.54072 / 47.2 |
| $r_4$ | 56.023 | $d_4$ 10.95 | |
| $r_5$ | 168.280 | $d_5$ 15.37 | 1.83400 / 37.2 |
| $r_6$ | −3453.988 | $d_6$ 8.27 | |
| $r_7$ | 71.325 | $d_7$ 23.82 | 1.79952 / 42.3 |
| $r_8$ | −246.250 | $d_8$ 9.05 | |
| $r_9$ | −195.000 | $d_9$ 6.25 | 1.72825 / 28.5 |
| $r_{10}$ | 58.013 | $d_{10}$ 10.25 | |
| $r_{11}$ | −176.700 | $d_{11}$ 3.75 | 1.69895 / 30.1 |
| $r_{12}$ | 70.078 | $d_{12}$ 18.85 | 1.78590 / 44.2 |
| $r_{13}$ | −79.025 | $d_{13}$ 0.25 | |
| $r_{14}$ | 996.250 | $d_{14}$ 18.80 | 1.65830 / 53.4 |
| $r_{15}$ | −155.585 | | |

F = 100.0
$F_{1,2}$ = 103.37
$F_{1,2,3,4}$ = 76.42

Seidel's Coefficients

| Lens Surface | $S_1$ | $S_2$ | $S_3$ | $S_4$ | $S_5$ |
|---|---|---|---|---|---|
| | 0.042 | 0.052 | 0.063 | 0.198 | 0.321 |
| 2 | −1.634 | −0.162 | −0.016 | −0.472 | −0.049 |
| 3 | 0.628 | 0.264 | 0.111 | 0.273 | 0.162 |
| 4 | −7.842 | 0.147 | −0.003 | −0.627 | 0.012 |
| 5 | 2.577 | 0.686 | 0.183 | 0.270 | 0.121 |
| 6 | −0.036 | −0.082 | −0.186 | 0.013 | −0.393 |
| 7 | −3.425 | 0.878 | 0.225 | 0.623 | 0.217 |
| 8 | 3.292 | −1.920 | 1.119 | 0.181 | −0.758 |
| 9 | −3.040 | 1.651 | −0.897 | −0.216 | 0.604 |
| 10 | −1.488 | −1.040 | −0.727 | −0.727 | −1.016 |
| 11 | −0.000 | 0.000 | −0.000 | −0.233 | 0.699 |
| 12 | 0.433 | 0.258 | 0.154 | 0.041 | 0.116 |
| 13 | 2.211 | −0.480 | 0.104 | 0.557 | −0.144 |
| 14 | −0.063 | 0.121 | −0.233 | 0.040 | 0.373 |
| 15 | 1.834 | −0.388 | 0.082 | 0.255 | −0.071 |
| SUM | 0.339 | −0.015 | −0.020 | 0.177 | 0.194 |

Example 3

| Radius of Curvature in m m | | Lens Spacing in m m | $n_i / \nu_i$ |
|---|---|---|---|
| $r_1$ | 217.623 | $d_1$ 6.17 | 1.49782 / 66.8 |
| $r_2$ | 69.596 | $d_2$ 9.20 | |
| $r_3$ | 234.650 | $d_3$ 4.75 | 1.51454 / 54.7 |
| $r_4$ | 64.373 | $d_4$ 12.02 | |
| $r_5$ | 108.900 | $d_5$ 23.57 | 1.83400 / 37.2 |
| $r_6$ | −34888.149 | $d_6$ 6.52 | |
| $r_7$ | 91.838 | $d_7$ 21.75 | 1.78800 / 47.5 |
| $r_8$ | −269.731 | $d_8$ 12.27 | |
| $r_9$ | −215.345 | $d_9$ 5.00 | 1.84666 / 23.9 |
| $r_{10}$ | 57.528 | $d_{10}$ 9.77 | 1.78800 / 47.5 |
| $r_{11}$ | 79.998 | $d_{11}$ 13.67 | |
| $r_{12}$ | −87.823 | $d_{12}$ 10.60 | 1.77250 / 49.6 |
| $r_{13}$ | −62.057 | $d_{13}$ 0.25 | |
| $r_{14}$ | 182.638 | $d_{14}$ 14.45 | 1.81600 / 46.8 |
| $r_{15}$ | −229.152 | | |

F = 100.0
$F_{1,2}$ = 92.05
$F_{1,2,3,4}$ = 85.04

Seidel's Coefficients

| Lens Surface | $S_1$ | $S_2$ | $S_3$ | $S_4$ | $S_5$ |
|---|---|---|---|---|---|
| 1 | 0.022 | 0.047 | 0.102 | 0.153 | 0.554 |
| 2 | −2.087 | −1.194 | −0.683 | −0.478 | −0.664 |
| 3 | 0.324 | 0.383 | 0.452 | 0.145 | 0.705 |
| 4 | −7.452 | −3.837 | −1.976 | −0.528 | −1.289 |
| 5 | 5.660 | 3.694 | 2.411 | 0.418 | 1.846 |
| 6 | −0.005 | −0.025 | −0.125 | 0.001 | −0.612 |
| 7 | 1.232 | 1.165 | 1.102 | 0.480 | 1.496 |
| 8 | 2.528 | −0.212 | 0.018 | 0.163 | −0.015 |
| 9 | −2.383 | 0.094 | −0.004 | −0.213 | 0.009 |
| 10 | −0.066 | −0.074 | −0.082 | −0.031 | −0.126 |
| 11 | −0.630 | −0.970 | −1.496 | −0.551 | −3.155 |
| 12 | −0.093 | 0.035 | −0.014 | −0.496 | 0.194 |
| 13 | 1.778 | 0.654 | 0.240 | 0.702 | 0.346 |
| 14 | −0.002 | −0.010 | −0.041 | 0.246 | 0.853 |
| 15 | 1.473 | 0.372 | 0.094 | 0.196 | 0.073 |
| SUM | 0.299 | 0.122 | −0.000 | 0.208 | 0.217 |

In the foregoing examples, the number of the lens surfaces and the radius of curvature are taken from the left hand side of the figures.

What is claimed is:

1. An intermediate wide angle retro focus objective lens system comprising a 7 group, 8 element lens wherein the lens elements have the following characteristics:

| Radius of Curvature in m m | | Lens spacing in m m | | $n_i / \nu_i$ |
|---|---|---|---|---|
| $r_1$ | 92.500 | $d_1$ | 3.95 | 1.51633 / 64.1 |
| $r_2$ | 57.275 | $d_2$ | 9.52 | |
| $r_3$ | 132.250 | $d_3$ | 5.32 | 1.69350 / 53.3 |
| $r_4$ | 55.875 | $d_4$ | 9.42 | |
| $r_5$ | 167.500 | $d_5$ | 7.50 | 1.83400 / 37.2 |
| $r_6$ | 1537.500 | $d_6$ | 2.50 | |
| $r_7$ | 68.313 | $d_7$ | 26.50 | 1.78590 / 44.2 |
| $r_8$ | −178.523 | $d_8$ | 9.27 | |
| $r_9$ | −149.500 | $d_9$ | 9.00 | 1.76182 / 26.6 |
| $r_{10}$ | 68.250 | $d_{10}$ | 9.67 | |
| $r_{11}$ | −159.375 | $d_{11}$ | 5.00 | 1.74077 / 27.8 |
| $r_{12}$ | 80.750 | $d_{12}$ | 19.20 | 1.806610 / 40.8 |
| $r_{13}$ | −79.500 | $d_{13}$ | 3.75 | |
| $r_{14}$ | −951.448 | $d_{14}$ | 8.75 | 1.78590 / 44.2 |
| $r_{15}$ | −111.275 | | | |

$F = 100.0$
$F_{1.2} = 95.13$
$F_{1.2.3.4} = 83.54.$

Seidel's Coefficients

| Lens Surface | $S_1$ | $S_2$ | $S_3$ | $S_4$ | $S_5$ |
|---|---|---|---|---|---|
| 1 | 0.284 | 0.131 | 0.061 | 0.368 | 0.198 |
| 2 | −2.375 | −0.138 | −0.008 | −0.595 | −0.035 |
| 3 | 0.493 | 0.272 | 0.151 | 0.310 | 0.255 |
| 4 | −9.272 | −0.324 | −0.011 | −0.733 | −0.026 |
| 5 | 2.942 | 0.879 | 0.263 | 0.271 | 0.160 |
| 6 | −0.187 | −0.225 | −0.270 | −0.030 | −0.360 |
| 7 | 4.454 | 0.977 | 0.214 | 0.637 | 0.187 |
| 8 | 3.146 | −1.869 | 1.111 | 0.247 | −0.806 |
| 9 | −2.925 | 1.608 | −0.884 | −0.289 | 0.645 |
| 10 | −1.069 | −0.892 | −0.743 | −0.634 | −1.148 |
| 11 | 0.003 | −0.010 | 0.034 | −0.267 | 0.771 |
| 12 | 0.264 | 0.175 | 0.116 | 0.026 | 0.094 |
| 13 | 1.593 | −0.366 | 0.084 | 0.561 | −0.148 |
| 14 | −0.074 | 0.120 | −0.193 | −0.046 | 0.386 |
| 15 | 3.029 | −0.261 | 0.023 | 0.395 | −0.036 |
| SUM | 0.306 | 0.078 | −0.054 | 0.223 | 0.134 |

Wherein the lenses are numbered from 1 to 8 from the object side, and lenses 5 and 6 form doublets; and wherein F: is the resultant focal length of the whole optical system;
$F_{1.2...i}$: is the resultant focal length of the first to the i-th lenses;
$n_i$: is the d-line index of refraction of the i-th lens;
$\nu_i$: is the Abbe's number of the i-th lens;
$r_k$: is the radius of curvature of the k-th surface; and
$d_j$: is the j-th lens spacing or lens thickness.

2. An intermediate wide angle retro focus objective lens system comprising a 7 group, 8 element lens wherein the lens elements have the following characteristics:

| Radius of Curvature in m m | | Lens Spacing in m m | | $n_i / \nu_i$ |
|---|---|---|---|---|
| $r_1$ | 175.400 | $d_1$ | 6.90 | 1.53172 / 48.9 |
| $r_2$ | 73.563 | $d_2$ | 9.42 | |
| $r_3$ | 128.468 | $d_3$ | 3.00 | 1.54072 / 47.2 |
| $r_4$ | 56.023 | $d_4$ | 10.95 | |
| $r_5$ | 168.280 | $d_5$ | 15.37 | 1.83400 / 37.2 |
| $r_6$ | −3453.988 | $d_6$ | 8.27 | |
| $r_7$ | 71.325 | $d_7$ | 23.82 | 1.79952 / 42.3 |
| $r_8$ | −246.250 | $d_8$ | 9.05 | |
| $r_9$ | −195.000 | $d_9$ | 6.25 | 1.72825 / 28.5 |
| $r_{10}$ | 58.013 | $d_{10}$ | 10.25 | |
| $r_{11}$ | −176.700 | $d_{11}$ | 3.75 | 1.69895 / 30.1 |

-continued

| Radius of Curvature in m m | | Lens Spacing in m m | | $n_i / \nu_i$ |
|---|---|---|---|---|
| $r_{12}$ | 70.078 | $d_{12}$ | 18.85 | 1.78590 / 44.2 |
| $r_{13}$ | −79.025 | $d_{13}$ | 0.25 | |
| $r_{14}$ | 996.250 | $d_{14}$ | 18.80 | 1.65830 / 53.4 |
| $r_{15}$ | −155.585 | | | |

$F = 100.0$
$F_{1.2} = 103.37$
$F_{1.2.3.4} = 76.42.$

Seidel'3 Coefficients

| Lens Surface | $S_1$ | $S_2$ | $S_3$ | $S_4$ | $S_5$ |
|---|---|---|---|---|---|
| 1 | 0.042 | 0.052 | 0.063 | 0.198 | 0.321 |
| 2 | −1.634 | −0.162 | −0.016 | −0.472 | −0.049 |
| 3 | 0.628 | 0.264 | 0.111 | 0.273 | 0.162 |
| 4 | −7.842 | 0.147 | −0.003 | −0.627 | 0.012 |
| 5 | 2.577 | 0.686 | 0.183 | 0.270 | 0.121 |
| 6 | −0.036 | −0.082 | −0.186 | 0.013 | −0.393 |
| 7 | −3.425 | 0.878 | 0.225 | 0.623 | 0.217 |
| 8 | 3.292 | −1.920 | 1.119 | 0.181 | −0.758 |
| 9 | −3.040 | 1.651 | −0.897 | −0.216 | 0.604 |
| 10 | −1.488 | −1.040 | −0.727 | −0.727 | −1.016 |
| 11 | −0.000 | 0.000 | −0.000 | −0.233 | 0.699 |
| 12 | 0.433 | 0.258 | 0.154 | 0.041 | 0.116 |
| 13 | 2.211 | −0.480 | 0.104 | 0.557 | −0.144 |
| 14 | −0.063 | 0.121 | −0.233 | 0.040 | 0.373 |
| 15 | 1.834 | −0.388 | 0.082 | 0.255 | −0.071 |
| SUM | 0.339 | −0.015 | −0.020 | 0.177 | 0.194 |

Wherein the lenses are numbered from 1 to 8 from object side, and lenses 6 and 7 form doublets; and wherein F: is the resultant focal length of the whole optical system;
$F_{1.2...i}$: is the resultant focal length of the first to the i-th lenses;
$n_i$: is the d-line index of refraction of the i-th lens;
$\nu_i$: is the Abbe's number of the i-th lens;
$r_k$: is the radius of curvature of the k-th surface; and
$d_j$: is the j-th lens spacing or lens thickness.

3. An intermediate wide angle retro focus objective lens system comprising a 7 group, 8 element lens wherein the lens elements have the following characteristics:

| Radius of Curvature in m m | | Lens Spacing in m m | | $n_i / \nu_i$ |
|---|---|---|---|---|
| $r_1$ | 217.623 | $d_1$ | 6.17 | 1.49782 / 66.8 |
| $r_2$ | 69.596 | $d_2$ | 9.20 | |
| $r_3$ | 234.650 | $d_3$ | 4.75 | 1.51454 / 54.7 |
| $r_4$ | 64.373 | $d_4$ | 12.02 | |
| $r_5$ | 108.900 | $d_5$ | 23.57 | 1.83400 / 37.2 |
| $r_6$ | −34888.149 | $d_6$ | 6.52 | |
| $r_7$ | 91.838 | $d_7$ | 21.75 | 1.78800 / 47.5 |
| $r_8$ | −269.731 | $d_8$ | 12.27 | |
| $r_9$ | −215.345 | $d_9$ | 5.00 | 1.84666 / 23.9 |
| $r_{10}$ | 57.528 | $d_{10}$ | 9.77 | 1.78800 / 47.5 |
| $r_{11}$ | 79.998 | $d_{11}$ | 13.67 | |
| $r_{12}$ | −87.823 | $d_{12}$ | 10.60 | 1.77250 / 49.6 |
| $r_{13}$ | −62.057 | $d_{13}$ | 0.25 | |
| $r_{14}$ | 182.638 | $d_{14}$ | 14.45 | 1.81600 / 46.8 |
| $r_{15}$ | −229.152 | | | |

$F = 100.0$
$F_{1.2} = 92.05$
$F_{1.2.3.4} = 85.04.$

Seidel's Coefficients

| Lens Surface | $S_1$ | $S_2$ | $S_3$ | $S_4$ | $S_5$ |
|---|---|---|---|---|---|
| 1 | 0.022 | 0.047 | 0.102 | 0.153 | 0.554 |

-continued
Seidel's Coefficients

| Lens Surface | $S_1$ | $S_2$ | $S_3$ | $S_4$ | $S_5$ |
|---|---|---|---|---|---|
| 2 | −2.087 | −1.194 | −0.683 | −0.478 | −0.664 |
| 3 | 0.324 | 0.383 | 0.452 | 0.145 | 0.705 |
| 4 | −7.452 | −3.837 | −1.976 | −0.528 | −1.289 |
| 5 | 5.660 | 3.694 | 2.411 | 0.418 | 1.846 |
| 6 | −0.005 | −0.025 | −0.125 | 0.001 | −0.612 |
| 7 | 1.232 | 1.165 | 1.102 | 0.480 | 1.496 |
| 8 | 2.528 | −0.212 | 0.018 | 0.163 | −0.015 |
| 9 | −2.383 | 0.094 | −0.004 | −0.213 | 0.009 |
| 10 | −0.066 | −0.074 | −0.082 | −0.031 | −0.126 |
| 11 | −0.630 | −0.970 | −1.496 | −0.551 | −3.155 |
| 12 | −0.093 | 0.035 | −0.014 | −0.496 | 0.194 |
| 13 | 1.778 | 0.654 | 0.240 | 0.702 | 0.346 |
| 14 | −0.002 | −0.010 | 0.041 | 0.246 | 0.853 |
| 15 | 1.473 | 0.372 | 0.094 | 0.196 | 0.073 |
| SUM | 0.299 | 0.122 | −0.000 | 0.208 | 0.217 |

Wherein the lenses are numbered from 1 to 8 from the object side, and lenses 6 and 7 form doublets; and wherein $F$: is the resultant focal length of the whole optical system;
$F_{1,2....i}$: is the resultant focal length of the first to the i-th lenses;
$n_i$: is the d-line index of refraction of the i-th lens;
$\nu_i$: is the Abbe's number of the i-th lens;
$r_k$: is the radius of curvature of the k-th surface; and
$d_j$: is the j-th lens spacing or lens thickness.

* * * * *

UNITED STATES PATENT AND TRADEMARK OFFICE
CERTIFICATE OF CORRECTION

PATENT NO. : 3,938,882
DATED : Feb. 17, 1976
INVENTOR(S) : Michiro Oishi

It is certified that error appears in the above-identified patent and that said Letters Patent are hereby corrected as shown below:

page 1, Assignee should read

-- Asahi Kogaku Kogyo Kabushiki Kaisha --

Col. 1, lines 20-26, the example numbers "1" "2" "4" should be parenthesized;

col. 2, lines 10-16, the example numbers "1" "2" "4" should be parenthesized;

col. 3, line 32, "$F_{1.2}$" should be -- $|F_{1.2}|$ -- line 40, insert the numeral -- 1 -- under "Lens Surface"

col. 4, line 7, "$F_{1.2}$" should be -- $|F_{1.2}|$ -- line 14, insert the numeral -- 1 -- under "Lens Surface"

line 44, "$F_{1.2}$" should be -- $|F_{1.2}|$ -- col. 5, line 16, "1.806610" should be -- 1.80610 --
line 20, "$F_{1.2}$" should be -- $|F_{1.2}|$ -- col. 6, line 8, "$F_{1.2}$" should be -- $|F_{1.2}|$ -- line 13, "Seidel'3" should be -- Seidel's --
line 62, "$F_{1.2}$" should be -- $|F_{1.2}|$ --

Signed and Sealed this first Day of June 1976

[SEAL]

Attest:

RUTH C. MASON
Attesting Officer

C. MARSHALL DANN
Commissioner of Patents and Trademarks